Figure 1:
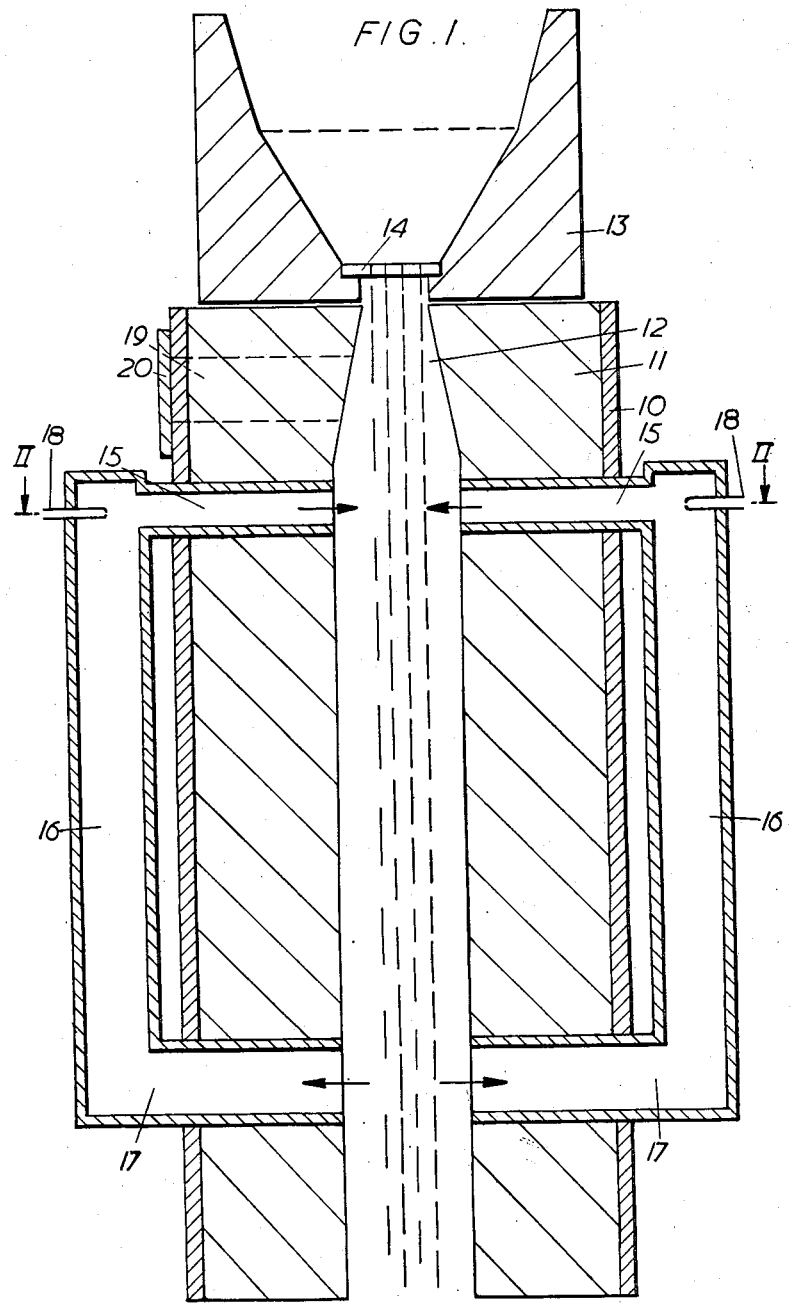

Jan. 24, 1961  T. C. CHURCHER  2,969,282
TREATMENT OF FERROUS METAL
Filed April 26, 1960  2 Sheets-Sheet 2

Inventor
Thomas Christopher Churcher
By
Aaron R. Townshend
Attorney

United States Patent Office 2,969,282
Patented Jan. 24, 1961

2,969,282

TREATMENT OF FERROUS METAL

Thomas Christopher Churcher, Sutton, England, assignor to The British Oxygen Company Limited, a British company Filed Apr. 26, 1960, Ser. No. 24,703

Claims priority, application Great Britain May 6, 1959

8 Claims. (Cl. 75—60)

This invention relates to the treatment of molten ferrous material by allowing the material in subdivided form to fall freely through a reaction space constitued by the interior of a refractory-lined tower in contact with a stream of an oxidising gas. Such a process may, for example, be used for the removal of impurities such as carbon, silicon, manganese, phosphorus and sulphur, either as a pretreatment to be followed by subsequent operations or to produce metal of a desired compoition. Processes of this type are described in British Patent No. 817,783 and in co-pending application No. 32,791/57 (835,159) both in the name of The British Oxygen Company Limited.

The term "oxidising gas" as used herein is intended to cover oxygen and gas mixtures rich in oxygen.

When the molten metal is in contact with the oxidising gas in its passage through the reaction space, a certain amount of iron oxide will be produced. This iron oxide is present in the gases leaving the reaction space in the form of very fine particles which remain in suspension in the gases to form an intensely-coloured brown fume. The fume leaving the reaction space has hitherto either been discharged into the atmosphere, causing an objectionable degree of atmospheric pollution together with a loss of iron, or alternatively has been fed into a conventional fume removal plant which is both bulky and expensive.

It is an object of the present invention to reduce the amount of fume leaving the reaction space.

According to the present invention, in a process for the treatment of molten ferrous metal by allowing the molten metal in subdivided form to fall freely through a reaction space constituted by the interior of a refractory-lined tower in contact with a stream of an oxidising gas as hereinbefore defined, the escape of fume from the reaction space is reduced by utilising the injector action of the oxidising gas fed to the reaction space to withdraw at least part of the fume from the reaction space at a point remote from the oxidising gas inlet or inlets and to return the withdrawn fume to the reaction space entrained in the oxidising gas.

The treatment process may be carried out as described in British Patent No. 817,783 or in co-pending application No. 32,791/57 (835,159). In these applications, the molten metal is allowed to fall freely through a reaction space constituted by the interior of an empty refractory-lined tower, in contact with a stream of oxidising gas, which may flow in the opposite direction to the fall of the metal, as described in Patent No. 817,783, or in the same direction as the fall of the metal, as described in application No. 32,791/57 (835,159). The metal falls through the tower in the form of a plurarlity of fine streams or of droplets which may be produced by any of the methods described in Patent No. 817,783 or in application No. 32,791/57 (835,159). For example, the molten metal may be fed at the top of the tower into a cup or crucible of refractory material having in its bottom one or more holes through which the metal can pass to form a fine stream. The diameter of the holes will depend on their number and on the rate at which the metal is treated. Ho.es as small as 1/16 inch and as large as 2 inches in diameter have been emp oyed. Alternatively, the molten metal may be arranged to flow over a weir system so shaped as to cause the molten metal to flow as one or more relatively thin streams which may break up into droplets as the molten metal falls through the tower under the influence of gravity. Other alternative arrangements include arranging for the molten metal to fall on to one or more baffles of refractory material; mechanically deflecting and splitting the stream of metal entering the tower, for example by a jet of oxygen or other oxidising or inert gas; and permitting two or more streams of metal to impinge against one another at the top of the tower so that the streams are deflected and broken up.

The oxidising gas may contain one or more powdered slag-forming and/or fluxing materials if desired.

The treated metal is collected at the bottom of the tower either in a hearth or in a ladle or other movable receptacle.

The oxidising gas is fed to the reaction space through one or more tuyeres located at the top or bottom of the reaction space according as co-current or countercurrent flow of the metal and oxidising gas streams is required. Wear on the refractory lining may be reduced by using one or more pairs of tuyeres, the tuyeres of each pair being located diametrically opposite one another, so that the jets of gas impinge against each other at the axis of the tower and the reacting materials are not directed against the refractory lining.

The fume may be removed from the reaction space through one or more ducts opening at one end into the reaction space at a point remote from the gas inlet or inlets. Thus, when co-current flow of metal and gas is used, the gas is fed into the top of the reaction space and the ducts open in to the bottom thereof. When countercurrent flow of metal and gas is used, the positions of the gas inlet or inlets and the duct or ducts is reversed. Each duct consists of a radial portion opening at one end into the interior of the tower and at the other connected by a substantially vertical portion with a gas inlet. The vertical portion may be formed within the refractory lining or wall of the tower or may be located externally of the tower. The oxidising gas at a comparatively h·gh pressure is arranged to be fed into the duct or ducts on its way to the reaction zone so that the inductor effect of the gas causes the fume to be sucked from the reaction space through the duct and entrained in the oxidising gas stream, with which it passes back into the reaction space.

Figure 2:
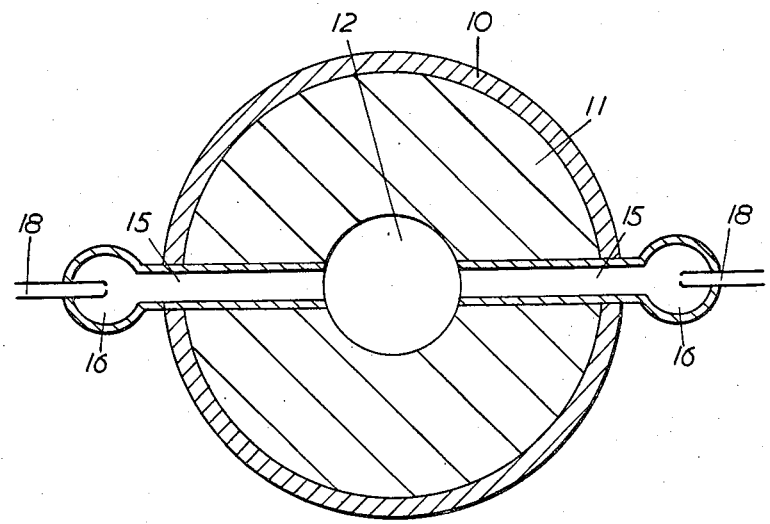

The invention will now be more particularly described with reference to the accompanying drawing in which Figure 1 is a vertical section of one form of apparatus for carrying out the invention; and Figure 2 is a horizontal section along the line II—II of Figure 1.

The apparatus comprises a tower in the form of a cylindrical steel shell 10 provided with a lining 11 of refractory material. The interior of the tower is empty and forms a cylindrical reaction space 12. The upper end of the reaction space 12 is closed by a crucible 13 of refractory material resting on the top of the tower and having a perforated bottom plate 14 through which molten ferrous metal poured into the crucible enters the reaction space in the form of a plurality of separate streams or droplets. The lower end of the reaction space 12 is open and beneath it is stationed a movable ladle or like vessel (not shown) for the reception of metal falling through the reaction space 12. Oxidising gas is fed into the reaction space through two radial inlets 15 located close to the top of the tower which, as shown in Figure 2, are located diametrically opposite one another, so that the two streams of oxidising gas issuing from them impinge at approximately the axis of the tower. This arrangement protects the lining 11 from direct impingement of the oxidising gas streams. The outer ends of the inlets 15 project beyond the outer wall of the shell 10 and are connected by vertical ducts 16 located outside the tower to the outer ends of two radial ducts 17 which open into the reaction space 12 at a point remote from the inlets 15 and relatively close to the bottom of the tower. The oxidising gas is fed to the inlets 15 through nozzles 18 opening at the junction of the inlets 15 with the vertical ducts 16. A burner for preheating the tower may be introduced at the bottom of the tower, the waste combustion gases leaving through a radial duct 19 located between the inlets 15 and the top of the tower, the outer end of the duct being normally closed by a cover plate 20.

In operation, the tower is pre-heated to prevent freezing of the metal first poured thereinto by means of a burner introduced at the bottom of the tower. The burner is then removed and the duct 19 closed by its cover plate 20. Oxidising gas is then fed into the reaction space 12 through the nozzles 18 and the inlets 15 and a charge of molten metal is poured into the crucible 13. The metal leaves the crucible and enters the top of the tower through the perforated plate 14 by which it is divided into a plurality of fine streams or droplets. The sub-divided metal falls through the reaction space 12 under gravity in co-current contact with a stream of oxidising gas which entering through the inlets 15 passes downwardly through the reaction space. In its passage through the reaction space, the subdivided molten metal is refined by reaction with the oxidising gas, impurities in the metal being oxidised and a certain amount of the iron being converted to finely-divided iron oxide which is suspended in the gas stream passing downwardly through the reaction space to form the characteristic brown fume.

A part of this fume is withdrawn through the ducts 17 and 16 by the injector action of the oxidising gas streams leaving the nozzles 18 and is entrained in these oxidising gas streams and with them recycled to the reaction space 12 through the inlets 15.

In general, owing to the formation of oxides of carbon by reaction of the oxygen in the oxidising gas with carbon contained as impurity in the molten ferrous metal, there will be a tendency for the pressure in the tower to build up to slightly above atmospheric pressure, resulting in some escape of fume from the tower, but the amount of fume which escapes in this way is small compared with the total amount of fume formed.

When pouring of the molten metal has been continued for a sufficient length of time to produce steady conditions in the reaction space, the oxygen introduced may in general be considered as all reacting with iron or with the impurities therein. The oxygen which reacts with the carbon present in the molten metal produces gaseous oxides of carbon, the remainder of the oxygen present being used to produce solid oxides.

The efficiency of the injector effect of the oxidising gas stream is preferably variable as desired. If the efficiency is too high during the early stages of pouring the metal, an undesirable amount of air may be drawn into the reaction space from the outer atmosphere and will dilute the oxidising gas and cool the system; on the other hand, if the injector efficiency is too low, particularly in the later stages of the process when build-up of oxides of carbon has taken place, fume will tend to escape from the reaction zone instead of being recycled. The efficiency of the injector action of the oxidising gas stream may be varied in any known manner, for example by altering the rate of flow of the oxidising gas or by altering the diameter or location of the injector nozzle or by the introduction of supplementary oxidising gas remote from the injector jet, or by any combination of these.

The recycling of the fume in accordance with the present invention does not affect the quantity of the gaseous portion of the fume, since the gas recycles substantially unchanged in quantity before it is discharged either from the appropriate end of the tower or, if desired, from any convenient point in the tower or the fume duct. The load of solid material carried by the gas is, however substantially reduced. The mechanism of this reduction in the solid content of the fume is not exactly known but is believed to be brought about in part by mechanical trapping, in part by chemical reaction, and in part by aggregation, which, while not reducing the weight of solid material in the fume, reduces its optical density.

It will be appreciated that recycling of the fume in accordance with the present invention involves the recycling of the oxides of carbon formed by oxidation of the carbon present. This may inhibit the loss of carbon from the metal owing to the oxides of carbon undergoing such reactions as:

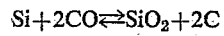

$$Si + 2CO \rightleftharpoons SiO_2 + 2C$$

The recycling of the fume may increase the temperature of the molten metal being treated above that obtaining when recycling is not used. If the temperature rise is excessive, it may be controlled by such methods as cooling the fume before entrainment in the oxidising gas stream, injecting a material, such as limestone, which absorbs heat by decomposition into the reaction space, and by increasing the efficiency of the injector action of the oxidising gas stream so that some air is drawn into the reaction space from outside.

In typical experiments using the process of the present invention, it has been found that the optical density of the fume leaving the reaction space is reduced by 75% and its weight by 50%.

I claim:

1. In a process for the treatment of molten ferrous metal by allowing the molten metal in subdivided form to fall freely through a reaction space in contact with a stream of an oxidising gas fed to said reaction space, the step of reducing the escape of fume from said reaction space by utilising the injector action of the oxidising gas fed to said reaction space to withdraw at least a part of the fume from said reaction space at a point remote from that at which said oxidising gas is fed to said reaction space and to return the withdrawn fume to said reaction space entrained in the oxidising gas.

2. In a process for the treatment of molten metal by allowing the molten metal in subdivided form to fall freely through a reaction space in contact with a stream of an oxidising gas fed to said reaction space in such manner that it flows downwardly therethrough, the step of reducing the escape of fume from said reaction space by utilising the injector action of the oxidising gas fed to said reaction space to withdraw at least a part of the fume from said reaction space at a point remote from that at which said oxidising gas is fed to said reaction space and to return the withdrawn fume to said reaction space entrained in the oxidising gas.

3. In a process for the treatment of molten metal by allowing the molten metal in subdivided form to fall freely through a reaction space in contact with a stream of an oxidising gas fed to said reaction space in such manner that it flows upwardly therethrough, the step of reducing the escape of fume from said reaction space by utilising the injector action of the oxidising gas fed to said reaction space to withdraw at least a part of the fume from said reaction space at a point remote from that at which said oxidising gas is fed to said reaction space and to return the withdrawn fume to said reaction space entrained in the oxidising gas.

4. A process according to claim 1 including the step of varying the efficiency of the injector action of the oxidising gas during the process.

5. Apparatus for the treatment of molten ferrous metal comprising an empty refractory-lined tower, means located at the top of said tower for subdividing a stream of molten metal entering said tower, an inlet for feeding an oxidising gas into said tower, a supply of oxidising gas connected to said inlet, and means for utilising the injector action of the oxidising gas fed to said at least one inlet to withdraw fume from said tower at a point remote from said at least one inlet and to return withdrawn fume to the interior of said tower entrained in the oxidising gas fed to said at least one inlet.

6. Apparatus according to claim 5 wherein said means for withdrawing fume from said tower comprises a radially disposed duct communicating at one end with the interior of said tower and connected at the other end with said inlet through a vertical duct.

7. Apparatus according to claim 6 wherein said vertical duct is located outside said tower.

8. Apparatus according to claim 6 wherein said vertical duct is located within the wall of said tower.

No references cited.